United States Patent [19]

Baker et al.

[11] 4,167,775
[45] Sep. 11, 1979

[54] CONTROLLER FOR SYNTHESIZER CIRCUIT FOR GENERATING THREE-TIER WAVEFORMS

[75] Inventors: Richard H. Baker, Bedford, Mass.; Kevin E. White, Washington Township, Warren County, N.J.

[73] Assignee: Exxon Research & Engineering Co., Florham Park, N.J.

[21] Appl. No.: 890,460

[22] Filed: Mar. 27, 1978

[51] Int. Cl.² .......................................... H02M 1/12
[52] U.S. Cl. ........................................ 363/42; 363/43
[58] Field of Search ...................... 363/39, 40, 41, 42, 363/43; 307/107; 318/230

[56] References Cited

U.S. PATENT DOCUMENTS

| 3,419,780 | 12/1968 | Vergez, Jr. | 363/43 |
|---|---|---|---|
| 3,510,749 | 5/1970 | Resch | 363/42 |
| 3,510,751 | 5/1970 | Resch | 363/42 |
| 3,916,285 | 10/1975 | Iwata et al. | 363/41 |
| 3,970,916 | 7/1976 | Kienscherf | 363/41 X |
| 4,047,083 | 9/1977 | Plunkett | 363/41 X |
| 4,099,109 | 7/1978 | Abbondanti | 363/42 X |
| 4,117,364 | 9/1978 | Baker | 363/43 X |

FOREIGN PATENT DOCUMENTS

932393 8/1973 Canada .................................. 363/41

Primary Examiner—William M. Shoop
Assistant Examiner—Peter S. Wong
Attorney, Agent, or Firm—Kenneth Watov

[57] ABSTRACT

A method and apparatus for producing control signals for operating an inverter circuit to convert a DC voltage into multitiered steplike notched N phase AC output signals (N=some positive integer number other than zero). A plurality of N reference sine waves are generated 90° out of phase with one another for N=2, and for N greater than 2, successive ones of said N reference sine waves are generated 360°/N out of phase with each other. First through third triangular sampling or timing waveforms are generated and concurrently compared with the uppermost, central and lowermost portions, respectively, of each individual one of said N reference sine waves, for producing N sets of first, second and third pulse width modulated pulse trains, respectively. Decoding logic networks are receptive of these N sets of first through third pulse trains, for decoding these pulse trains into the necessary control signals for operating a particular inverter circuit.

20 Claims, 11 Drawing Figures

_Fig. 1._

_Fig. 2._

CONTROLLER FOR SYNTHESIZER CIRCUIT FOR GENERATING THREE-TIER WAVEFORMS

The field of the present invention relates generally to waveform synthesizer and inverter systems, and more particularly to a method and control system for operating particular inverter and waveform synthesis systems.

Many applications require that a DC voltage be converted into an AC voltage having a particular waveform, most often a sinusoidal waveform. Many different inverter and waveform synthesis systems are avilable for providing this function. These systems may be used to drive many different types of AC loads, and are often adapted for driving AC motors over a range of different combinations of speed and torque. To perform this function, the synthesized AC voltage waveform, which is sinusoidal in this example, must be independently variable in frequency and amplitude, well regulated over a wide range of power levels, and adaptable to operate with either single or multiphase AC loads. It is also important that the synthesized waveform be relatively free of harmonic components, in the limit approaching a pure sinusoidal waveform. As is known in the art, such waveforms can be synthesized using pulse width modulation (PWM) techniques for producing a synthesized multitier steplike waveform equivalent of a desired waveform. Each half-cycle of the synthesized waveform is chopped into a series of discrete pulses, producing a notched waveform. The time occurrence and pulse widths of the individual pulses of the synthesized waveform are controlled for reducing the harmonic content of the synthesized waveform. Also, many of the known control circuits for operating such waveform synthesizer and inverter systems derive control signals by the comparison of a sine wave reference signal or waveform with a single triangular commmon waveform, the latter having a frequency which is substantially higher than the former. The pulse train of control signals or pulses derived from such comparison have pulse widths corresponding to the period of time between successive intercepts of the reference signal and timing signal when the timing signal is greater in amplitude than the reference signal. Such a control system can be found in Resch U.S. Pat. No. 3,510,751, issued on May 5, 1970, for producing a single level bipolar PWM synthesized sine wave. Also, in Plunkett U.S. Pat. No. 4,047,083, issued on Sept. 6, 1977, a motor drive system including an inverter for producing a single-tier bipolar PWM synthesized sine wave teaches control signal generating means utilizing the comparison of a sine wave reference signal with a single triangular timing waveform.

The present inventors recognize that generally the purity of the synthesized waveform is enhanced when the notched PWM synthesized waveform is multitiered, and that the control system for producing the control signals for driving a particular waveform synthesizer circuit for producing substantially a three-tiered waveform having a dynamic zero reference, is simplified if three triangular timing waveforms are level-shifted from one another and used for sampling the upper third, middle third, and lower third portions of each cycle of the reference signal. Accordingly, the present invention includes the steps of producing a plurality of reference AC waveforms each having a predetermined waveshape and phase relation in comparison to the other reference AC waveforms; producing first through third AC sampling waveforms, having the same phase and frequency, the frequency being substantially greater than that of the reference AC waveforms; comparing the first through third AC sampling waveforms concurrently with the uppermost, central and lowermost portions, respectively, of each individual one of the plurality of reference AC waveforms, for producing a like plurality of sets of first, second and third pulse width modulated pulse trains, respectively; and decoding the sets of pulse trains for producing control signals for operating a like plurality of inverter circuits for producing multiphase related output voltages, the waveforms of which each have three tiers, are notched, and have a dynamic zero.

In the drawings, wherein like elements have the same reference designation.

Figure 1:
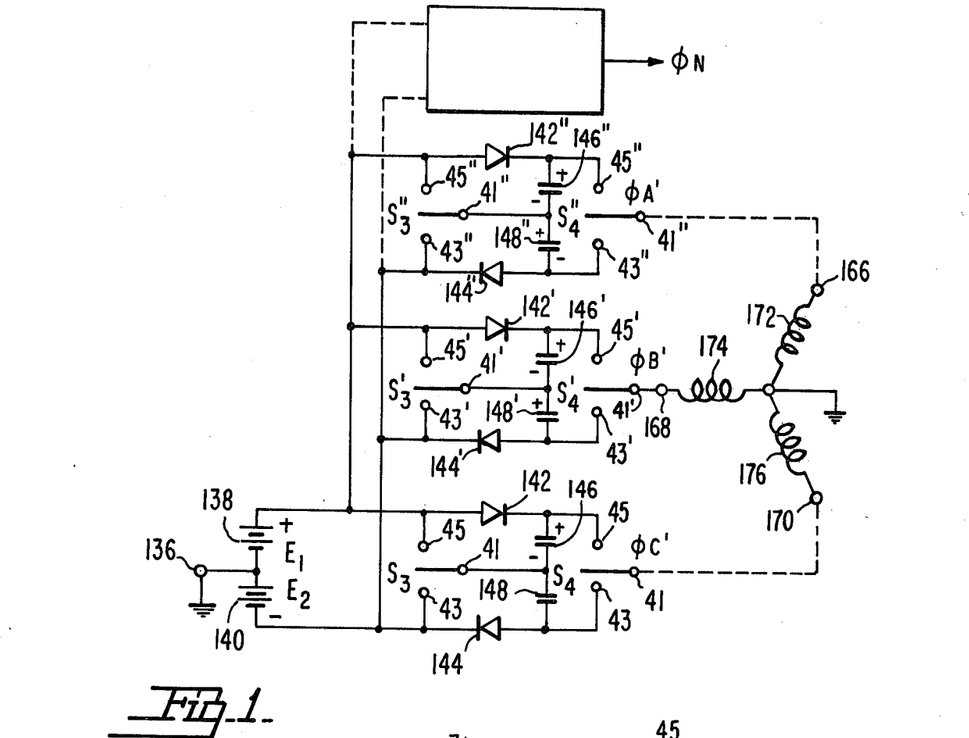
FIG. 1 is a circuit schematic diagram of one example of a waveform synthesizer circuit for generating three-tier waveforms.
Figure 2:
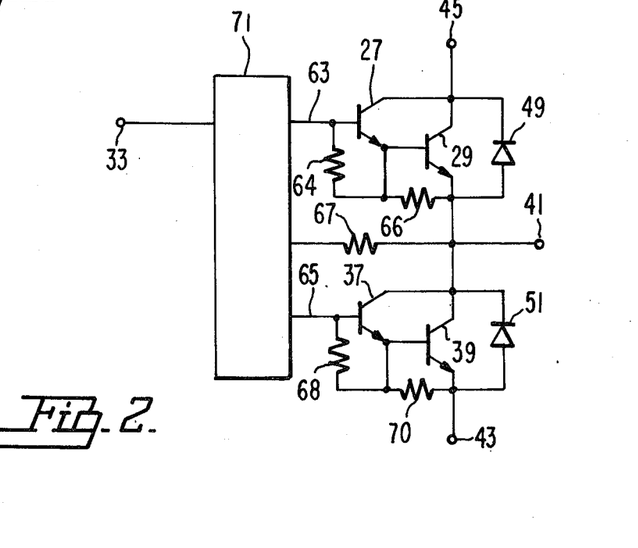
FIG. 2 is a circuit schematic diagram of a solid-state switching circuit for providing each one of the switches $S_3$, $S_4$, $S'_3$, $S'_4$, $S''_3$, $S''_4$ of FIG. 1.
Figure 3:
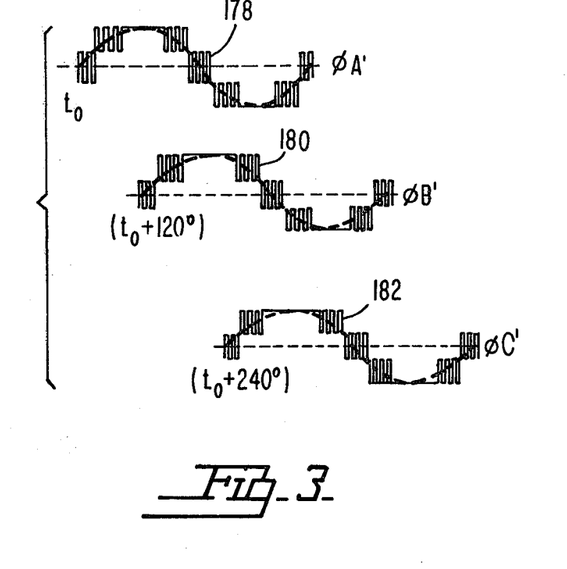
FIG. 3 shows typical three-phase related synthesized sine waves, in this example, generated by the synthesizer circuit of FIG. 1.

The waveform synthesizer inverter circuit of FIG. 1 is identical to the FIG. 10 shown in the copending application of Richard H. Baker, U.S. Ser. No. 846,696, filed on Oct. 31, 1977, for SYNTHESIZER CIRCUIT FOR GENERATING THREE-TIER WAVEFORMS. Also, FIGS. 2 and 3 are identical to FIGS. 6 and 11, respectively, of the same copending application. Accordingly, since a detailed discussion of each one of these figures is given in the previously-mentioned copending application, only a general description of the circuits of FIGS. 1 and 2 are given herein.

Figure 4:
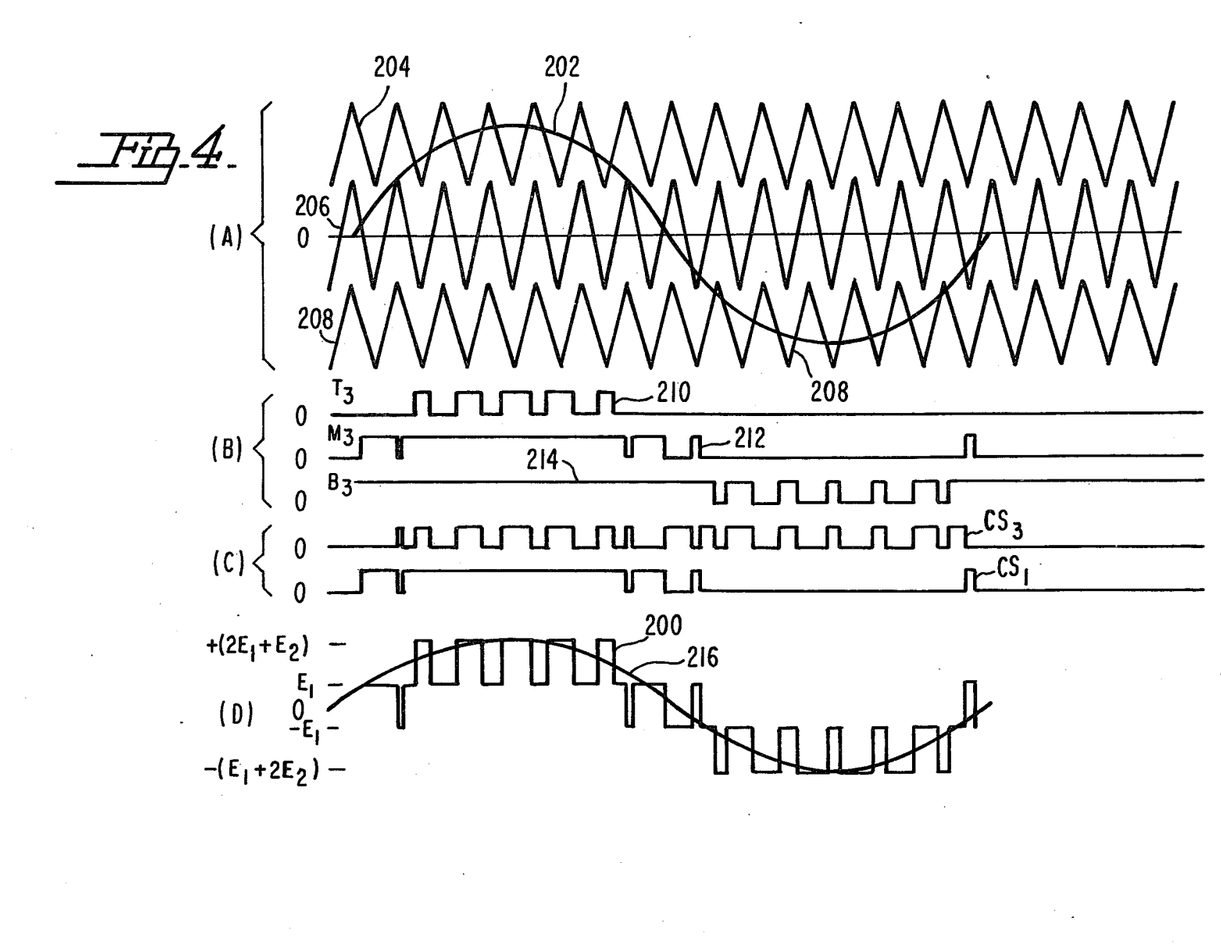
FIG. 4 is a timing diagram showing pertinent waveforms showing in FIG. 4A a full-cycle of a sine wave reference signal and its intercepts with three level-shifted triangular timing waveforms, FIG. 4B showing the three pulse trains derived from the comparison of the three triangular timing waveforms with the reference sine wave, FIG. 4C showing the decoded pair of pulse trains derived from the three pulse trains of FIG. 4B, and FIG. 4D showing the synthesized sine wave obtained from operating the circuit of FIG. 1 with the control signals of FIG. 4C.

The waveform synthesizer inverter circuit of FIG. 1 can be controlled, for example, for inverting the DC voltages $E_1$ and $E_2$ from batteries 138,140, respectively, into N-phase related AC output signals, such as the three-phase related synthesized sine wave signals 178,180,182, shown in FIG. 3. In FIG. 1, when the poles 41 are connected to the contacts 45 of the switches $S_3$ and $S_4$, respectively, (assume that the capacitor 146 has been previously charged to have a voltage thereacross approaching the sum of $E_1$ and $E_2$) the voltage between the pole 41 of switch $S_4$ and ground terminal 136 is equal to $(2E_1+E_2)$, because the capacitor 146 is effectively connected in series with the battery 138 between these circuit points. Also at this time, the capacitor 148 has the batteries 138 and 140 connected across it, for charging the capacitor 148 to a level where the voltage thereacross approaches the sum of $E_1$ and $E_2$. With switch $S_3$ remaining with its pole 41 connected to its terminal 45, if switch $S_4$ is operated to place its pole 41 at its lower contact 43, the voltage at the pole terminal 41 of switch $S_4$ is now $-E_2$, as provided by the series combination of the forward-conducting diode 144 and battery 140 between ground terminal 136 and contact 43 of $S_4$. If the pole 41 of switch $S_3$ is moved to the lower contact 43 of this switch, the diode 144 will become back-biased and the charged capacitor 148 will effectively be connected in series with the battery 140 between terminals 136 and contact 43 of switch $S_4$, causing a voltage level of $(-E_1-2E_2)$ to be applied to the pole 41 of the switch $S_4$. Lastly, if the switch $S_4$ is operated to move its pole 41 to its upper contact 45, the level of voltage at the pole 41 of switch $S_4$ changes to $+E_1$ as derived from the series connection of the now forward-biased diode 142 in series with the battery 138 between ground terminal 136 and the upper contact 45 of switch $S_4$. Accordingly, by controllably operating the switches $S_3$ and $S_4$ to be in various combinations of their operating conditions for predetermined periods of time over a full-cycle of a desired waveform, that waveform can be synthesized via such operation. For example, FIG. 4D shows a three-tiered steplike notched synthesized sinusoid produced via appropriate operation of the switches $S_3$ and $S_4$. In a similar manner, in FIG. 1 second and third inverter stages shown with identical reference designations in primed and double-primed notation, respectively, are operable along with the phase C' stage for providing a three-phase related output voltages 178,180,182 (see FIG. 3) for driving a load such as the motor windings 172,174,176, of a three-phase motor, for example. As shown, up to N such inverter stages can be operated for providing an N-phase AC output signal or voltage for driving an N-phase load.

The switches $S_3$, $S_4$, of the lowermost inverter stage of FIG. 1, and the primed and double-primed equivalents in the upper two inverter stages, respectively, on up to the comparable switches of the phase N inverter stage, are each shown as single-pole-double-throw switches. In FIG. 2, a portion of a high-power switching amplifier circuit is shown suitable for serving as each one of the switches $S_3$ and $S_4$ of the first inverter stage through the Nth inverter stage of the waveform synthesizer circuit of FIG. 1, for example. In operation, when a control signal having a positive or high-level voltage (hereinafter referred to as a level of "1") is applied to the control terminal 33, the buffer stage 71 responds applying current along control line 65 into the base of transistor 37. The NPN Darlington amplifier 37,39 responds by turning on and substantially connecting output terminal 41 to terminal 43 via the main conductance path of the Darlington 37,39. Also at this time, in response to the high-level signal at terminal 33, the buffer stage 71 responds by drawing charge out of the base of transistor 27 thereby keeping Darlington 27,29 turned off. When the control signal goes low (hereinafter referred to as level "0"), the buffer control circuit 71 responds by drawing charge from the base of transistor 37 and the Darlington amplifier 37,39 turns off in response thereto. Meanwhile, the buffer circuit 71 now supplies current into the base of transistor 27, Darlington amplifier 27,29 turns on, and current flows from the input terminal 45 through the main current path of the Darlington amplifier 27,29 to the output terminal 41 raising the level of voltage at the output terminal 41 to a positive level (assuming a positive voltage is being applied at terminal 45). Resistors 64,66,68 and 70 are used to control the collector-base leakage currents of transistors 27,29,37 and 39, respectively. It should be noted that other transistorized switching amplifiers of circuits providing the same function as the circuit of FIG. 6, can be applied for use as switches $S_3$ and $S_4$ and their counterparts.

In FIG. 4A through 4D, the various signals and waveforms associated with the present method for producing a three-tiered steplike notched output waveform 200 having a pattern substantially equivalent to a reference AC waveform 202, in this example a sine wave. It should be noted that the reference AC waveform can be other than a sine wave. In FIG. 4A three triangular timing or sampling waveforms 204,206,208, respectively, are concurrently compared with the reference sine wave 202. In this example, the triangular waveforms 204,206,208 have the same phase and frequency but different amplitude ranges, for sampling the uppermost (upper third), central (middle third), and lowermost (lower third) portions of the reference sine wave 202, respectively, as shown. As shown, in this example, it has been found that for optimum performance the triangle wave 206 should have a greater range of amplitude than the upper and lower triangle waves 204,208, whereby the triangle waveform 206 overlaps or extends into the amplitude ranges of the triangle waves 204,208. In other examples, where inverter circuits different from those of FIG. 1 are used, the relative amplitude ranges and positioning of the triangle waves 204,206,208 may be other than described herein. In FIG. 4B, the comparison of the triangle waves 204,206,208 with the reference AC waveform 202 produces pulse trains 210,212 and 214, respectively. The pulse widths or time intervals of each one of the pulses of the pulse trains 210,212,214 correspond to the period of time that the amplitude of their associated sampling waveform 204,206,208, respectively, is less positive or more negative than the amplitude of the reference waveform 202. Accordingly, each one of the pulse trains 210,212,214, are pulse width modulated (PWM) representations of the comparison of and times of intercept between the triangle waves 204,206,208 and the reference AC waveform 202.

In FIG. 4C, the intercept or PWM signals 210,212,214 are decoded for producing the control signals $CS_3$ and $CS_4$ for operating the switches $S_3$, $S_4$, respectively, of the phase C' inverter circuit of FIG. 1, for example, for producing the synthesized waveform 200. The pure sine wave equivalent of this output waveform 200 is shown as waveform 216 overlaying the synthesized waveform 200. It should be noted that the synthesized waveform 200 has a dynamic zero, that is, the synthesized waveform 200 does not begin, end, or have any portions thereof at zero volt for a given period of time, but has transitions that cross the zero axis in step function-like manner, thereby producing the dynamic zero reference. It should be noted that if some other inverter circuit than that of FIG. 1 is used for obtaining the synthesized output waveform 200 from the intercept signals 210,212 and 214, then the decoded signals may be other than shown in FIG. 4C, that is, a different decoding scheme than that shown may be required. The method of the present invention has been illustrated for producing a single-phase output voltage or synthesized waveform 200. For producing multiphase synthesized output waveforms, this same method is used, except that the reference waveforms 202 for each phase are properly shifted in phase from one another for obtaining the appropriate phasing between the multiphase output signals 200.

Figure 5:
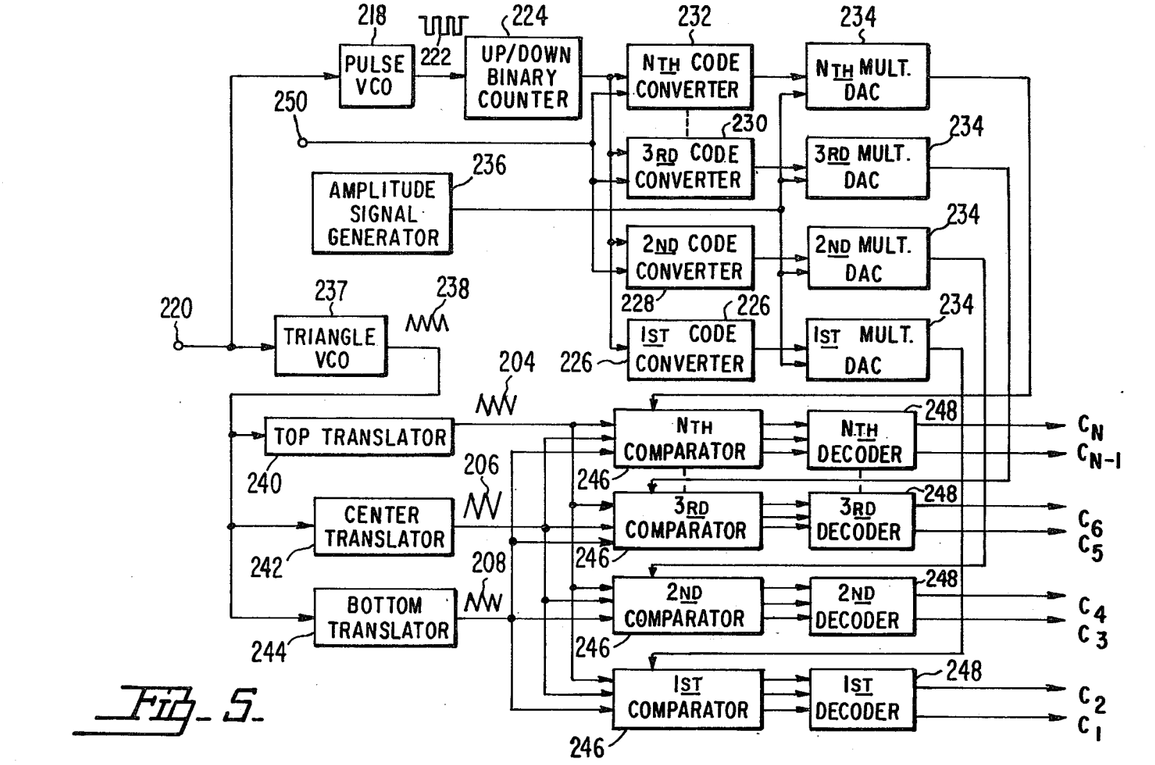
FIG. 5 is a block diagram of a controller for providing the control signals for operating the waveform synthesizer inverter circuit of FIG. 1 to produce N phase related AC output voltages.

A block diagram of the apparatus for carrying out the method of the present invention is shown in FIG. 5. A VCO (voltage-controlled oscillator) 218 is responsive to a frequency of speed-related voltage input signal applied to terminal 220 for producing a train of clock pulses 222 having a frequency proportional to the voltage amplitude of the speed input signal. The clock pulses 222 are applied to an up/down binary counter 224, which counts the clock pulses up from zero to a predetermined maximum binary number and then back down to zero from this maximum binary number, this process of counting being repetitive. The output signal from the binary counter 224 is applied as an input signal to each one of N code converters 226,228,230,232, for converting the binary signal to a particular sine weighted binary output signal from the converters. It should be noted that N is equal to some positive integer number other than zero. If N is equal to 1, then only a single-phase output waveform is being synthesized, for example. If N is equal to 2, then it is assumed that two-phase related output signals are required to be synthesized, whereby the sine weighted binary output signal from the second code converter 228 is 90° out of phase with the sine weighted binary output signal from the first code converter 226. If N is greater than 2, then the sine weighted output signals from successive ones of the code converters 226 up to the Nth code converter 232 differ in phase from one another by the quantity (360°/N). The sine weighted binary output signals from the first through Nth code converters 226-232 are converted by first through Nth multiplying digital-to-analog converters (DAC) into the analog representations thereof, respectively, in this example sine waves properly related in phase one to the other. As previously explained, the code converters 226-232 can be programmed for other than sine weighting, that is, for producing other than a sine wave signal from the output terminals of the DAC's 234. An amplitude signal generator 236 is controllable for providing an amplitude signal as a reference to each one of the DAC converters 232 for determining the amplitude of the N reference AC waveforms produced by these converters 234.

A triangle VCO 237 is responsive to the level or amplitude of the speed input signal for providing a triangular waveform output signal 238 having a frequency directly proportional thereto over a range between predetermined minimum and maximum frequencies. This triangular waveform 238 is level shifted by the top, center and bottom translators 240,242,244 for providing the first, second and third triangular sampling or timing waveforms 204,206,208, respectively. It should be noted that in some applications other than a triangular waveform is suitable for sampling a reference waveform, one example being a sawtooth waveform. The advantage of using triangular waveforms for sampling is the symmetry inherent in such waveforms. Such symmetry in general produces more symmetrical output waveforms having lower harmonic content. The sampling waveforms 208,206,204 are each supplied as individual input signals to first through Nth comparators 246. Each one of the first through Nth comparators 246 compares each one of the first through third AC sampling waveforms 204,206,208 with the first through Nth reference AC waveforms from the DAC(s) converters 234, for producing a set of three PWM pulse trains, respectively, representing the intercepts therebetween, as previously described. For example, the first comparator 246 produces the PWM pulse trains 210,212,214, shown in FIG. 4. The first through Nth decoders 248 decode the PWM pulse trains from the comparators 246, for producing the control signals $C_1$ through $C_{N-1}$, $C_N$, for controlling the operation of the switches of the waveform synthesizer circuit of FIG. 1 to produce N-phase related synthesized waveforms. If, for example, the control signals $C_1$ through $C_6$ are produced for operating the inverter system of FIG. 1 for producing the three-phase voltages for operating the three-phase motor represented by the motor winding load 172,174,176, assume that the phase A voltage has 0° phase, the phase B voltage +120° phase with respect to phase A, and the phase C voltage has +240° phase with respect to the phase A voltage. To reverse the direction of rotation of the motor, a forward/reverse signal applied to terminal 250 is changed in state from a binary "1" level to a binary "0" level for reversing the phasing of the phase B and phase C voltages, whereby the phase B voltage is changed to be +240° out of phase with the phase A voltage, and the phase C voltage to be +120° out of phase with the phase A voltage. The same result can be accomplished by changing the positive or leading phase voltages B and C with respect to the phase A voltage, to negative or lagging phase-related voltages with respect to the phase A voltage. In other words, for a system producing N multiphase related synthesized output voltage waveforms, the code converters are responsive to the binary state of the forward-/reverse signal applied to terminal 250 for producing either leading or lagging phase-related signals between successive ones of the sine-weighted binary output signals produced by the first through Nth code converters 226,228,230,232, for ultimately producing either a leading or lagging phase relationship between successive ones of the synthesized output signals from the inverter circuit of FIG. 1.

The controller of FIG. 5 is operable for selectively varying the amplitude of the reference AC waveform for providing a predetermined notching pattern in the output waveform from the inverter circuit. Alternatively, for selectively varying the frequency of the reference AC waveform while keeping the amplitude thereof constant, a desired frequency with constant amplitude of the output waveform from the inverter can be obtained, or for simultaneously varying the amplitude and frequency of the reference AC waveform for producing a pattern in the output waveform from the inverter providing a constant volts per hertz ratio thereof, or any other desired relationship.

Figure 6A:
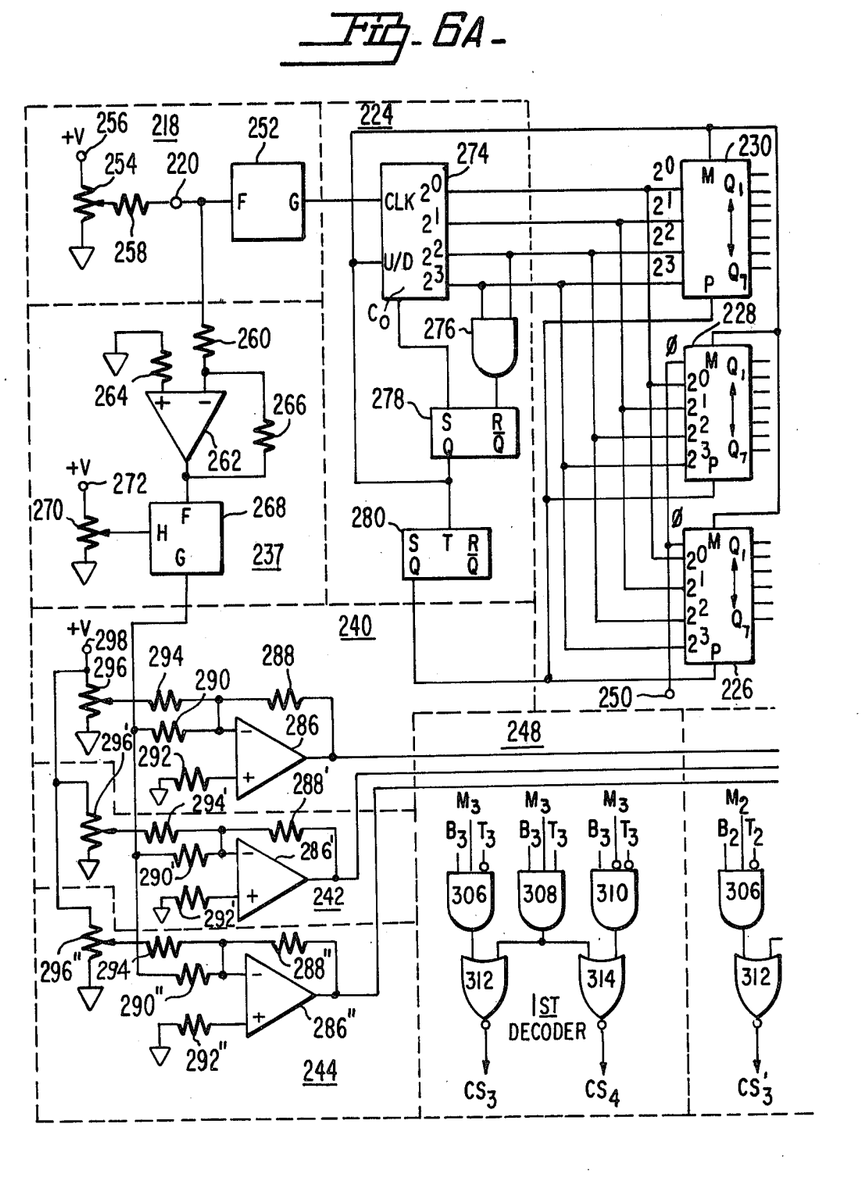
FIG. 6 is a circuit schematic diagram of a controller of FIG. 5 for providing control signals for operating the waveform synthesizer system of FIG. 1 to produce synthesized three-phase sine wave output voltages.
Figure 6B:
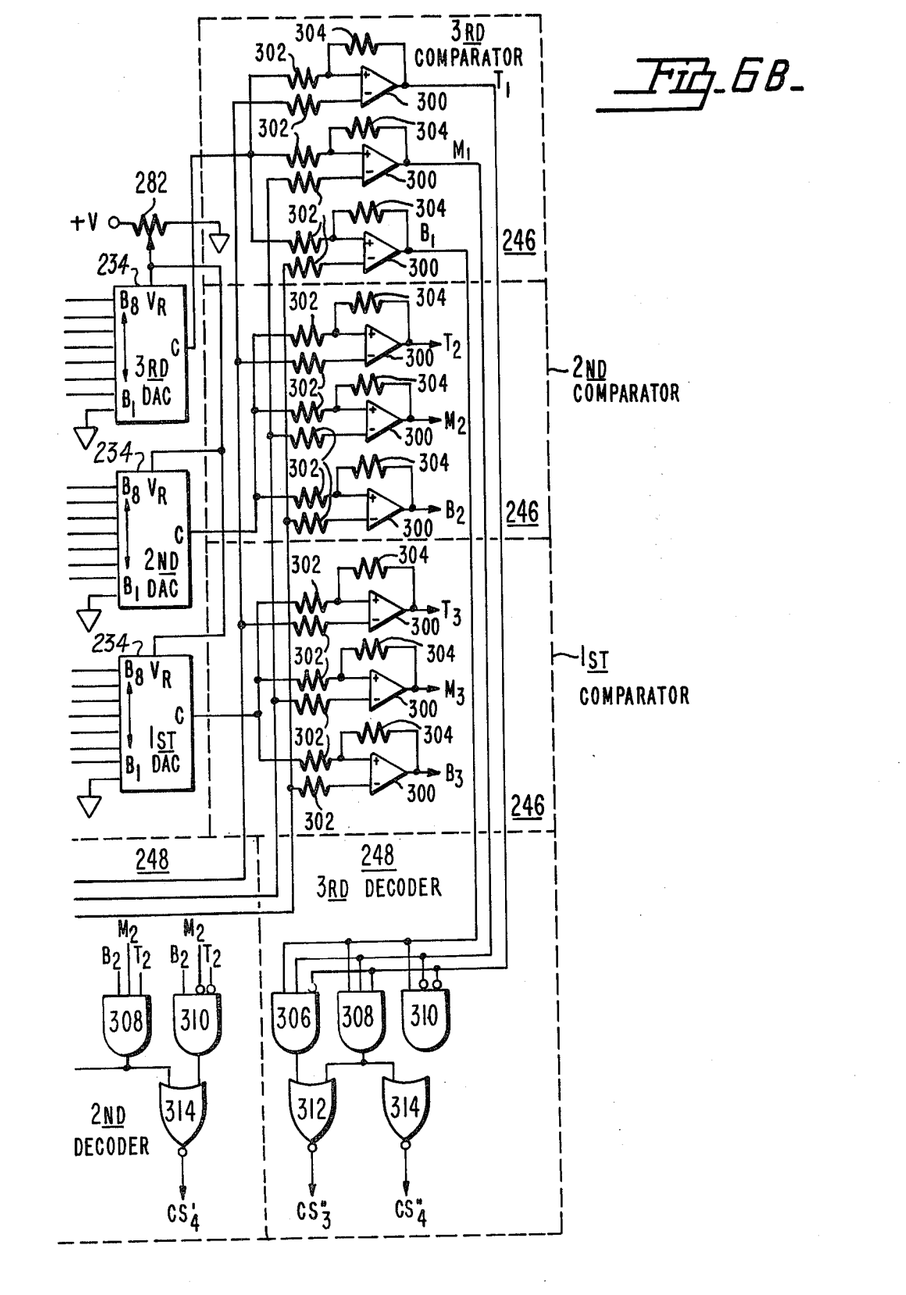

In FIG. 6, a circuit schematic diagram of the present controller for producing control signals $CS_3$, $CS_4$, $CS'_3$, $CS'_4$, $CS''_3$, $CS''_4$, for operating the similarly designated switches of the inverter circuit of FIG. 1 for producing three-phase output voltages, for example. In operation, with reference to both FIGS. 5 and 6, the pulse VCO 218 includes an integrated circuit pulse VCO chip 252, a speed adjust potentiometer 254 having a voltage terminal 256 for receiving a voltage +V, and an input resistor 258. The potentiometer 254 is adjustable for changing the level of the speed input signal applied to terminal 220, for controlling the frequency of the pulsed output signal from the VCO chip 252, and for controlling the frequency of the triangle VCO 237.

The triangle VCO 237 includes an input resistor 260 for applying the speed input signal to the inverting terminal of a scaling operational amplifier 262. The operational amplifier 262 also has a grounding resistor 264 connected from its noninverting terminal to ground, and a feedback resistor 266 connected between its output and inverting input terminals. The ratio between the values of feedback resistors 266 and input resistor 260 primarily determine the scaling of the speed input signal applied to terminal F of a triangle wave VCO chip or integrated circuit 268. A potentiometer 270 having a voltage terminal 272 for receiving an operating voltage +V is adjustable for applying a DC voltage to the H terminal of the triangle VCO chip 268 for adjusting the amplitude of the triangle output signal developed at output terminal G of this chip.

The up/down binary counter 224 includes an integrated circuit binary counter chip 274 having a clock terminal (CLK) for receiving the clock signal from the pulse VCO chip 252 (developed at output terminal G of this VCO Chip), and an up/down (U/D) terminal for receiving a binary "0" signal for counting down, and a binary "1" signal for counting up. Also included in the binary counter network 224 are an AND gate 276, an RS flip-flop 278, and a toggling flip-flop 280. In operation, when the binary count or value of the binary output signal $2^0$, $2^1$, $2^2$, $2^3$ from the counter chip 274 is of zero value, a binary 1 or high signal is produced at the $C_0$ terminal of this chip for setting flip-flop 278, causing the Q output terminal of this flip-flop to go high, threby placing the binary counter 274 in an up count mode. When the value of the binary output signal from the counter 274 reaches a decimal 12 equivalent AND gate 276 responds by applying a reset signal to the reset terminal of the flip-flop 278, resetting this flip-flop, and causing its Q output terminal to go low or produce a binary "zero" signal. In response to the low signal from flip-flop 278, the binary counter 274 now begins counting down from a decimal 12, equivalent and when the zero count is reached, its $C_0$ output terminal again goes high for setting flip-flop 278 to reinitiate an upcount as previously described. This cycle of up-and-down counting is repetitive during the operation of the controller. The toggle flip-flop 280 is toggled each time the signal from the Q output terminal of flip-flop 278 goes high. Accordingly, during one cycle of up-and-down counting of the counter 274, the output signal from the Q terminal of the toggle flip-flop 280 is high or at a binary "1", and during the immediately-following next cycle of up-and-down counting of counter 274, the output signal from the Q terminal of flip-flop 280 is low or at binary "0". If as in this example a sinusoidal waveform is being produced, then the signal from the Q terminal of flip-flop 280 is "high" for one-half cycle of the sinusoidal waveform, and "low" for the next half-cycle of the sinusoidal waveform.

The code converters 226,228,230 are each integrated circuit memory chips, each one of which has been programmed for converting the binary output signal from the counter 274 into a sine-weighted binary signal. In this example, the integrated circuit memories 226,228,230 have been programmed for also providing the appropriate phase differences between the sine-weighted binary output signals thereof for producing three-phase related sinusoidal output voltages. As previously explained, the code converter or memory chips 226,228,230 can also be programmed for providing some other weighting or conversion of the binary output signal from the counter 274, for producing other than a sinusoidal reference signal, that is, for producing any other practical reference AC waveform(s). Depending upon the application, the integrated circuit memories 226,228,230 can be provided by a programmable read only memory (PROM), an erasable programmable read only memory (EPROM), or a read only memory chip (ROM), etc. In the present example, each one of the memory chips 226,228,230 have a mode input terminal M receptive of the up/down output signal from the flip-flop 278, and a polarity input terminal P receptive of the output signal from the Q terminal of the toggle flip-flop 280. The combination of signals received by the P and M terminals determine the polarity and phase of the output signal from each respective memory chip. The phase relationship between the sine-weighted binary output signals from the memory chips 226 and 228 is reversed by changing the condition of the phasing or forward/reverse signal 250 (in the case of driving a motor, for example) from a binary "1" to a binary "0", for example.

The digital-to-analog converters (first, second and third DAC's) 234 are in this example integrated circuits. The amplitude signal generator 236 is provided by a potentiometer 282 connected between ground and a voltage terminal 284 for receiving a DC voltage +V. The potentiometer 282 is adjusted for providing a necessary level of reference voltage $R_R$ to each one of the DAC's 234 for setting the amplitude of the output signal derived from the output terminals C of each one of these DAC circuits 234. In this example, the output voltages are sinusoidal, with the output voltage from the second DAC being +120° out of phase with the third DAC, and the output voltage from the first DAC being +240° out of phase with the third DAC, that is that the phasing of the sinusoidal output signals from the first and second DAC's 234 are leading the sinusoidal output signal from the third DAC. At this time it is assumed that a binary 1 signal is being applied to the phase terminal 250. If this phasing signal is now changed to a signal "0", the phasing of the output signals from the first and second DAC's 234 is reversed or changed to negative phasing, causing these signals to now be lagging the output signal from the third DAC.

The top translator or level-shifting circuit 240 includes an operational amplifier 286, a feedback resistor 288, an input resistor 290, a grounding resistor 292, another input resistor 294, a potentiometer 296 and a voltage terminal 298 for receiving an operating voltage +V. The potentiometer 296 is adjusted for supplying a particular value of offset voltage to the summing amplifier 286 for offsetting the triangular wave from the triangle VCO network 237 a desired amount. The circuits for the center and bottom translators or level-shifting networks 242,244 are identical to the circuit for level-shifting network 240, except that the values of the feedback resistors for each one of these circuits may differ for providing different amplitude ranges for the triangular wave level-shifted output signals from each one of these circuits, respectively. In recognition that in certain applications the values of the components may differ between the top, center bottom, and bottom translators 240,242,244, the reference designations for the latter two are primed and double-primed, respectively, but otherwise correspond to the designations for the top translator circuit 240. It has been found in practice that if, for example, the reference sinusoidal waveforms produced by the first, second and third DAC's each have a maximum amplitude of about ±4 volts, peak-to-peak, that optimized control signals are produced by setting the top translator circuit 240 for producing a level-shifted triangular output signal having an amplitude range of +2 volts to +5 volts; the center translator circuit 242 for providing a triangular output signal having an amplitude range from −2.2 volts to +2.2 volts; and the bottom translator circuit 244 for producing a triangle voltage having an amplitude range from −2 volts to −5 volts.

The first, second and third comparator networks 246 each include three individual voltage comparators 300, each voltage comparator 300 including a pair of identically valued input resistors 302 and a feedback resistor 304. As shown, and as previously explained in more general terms, the first comparator network 246 is operative for comparing the reference AC waveform, sinusoid in this example, with each one of the triangular waveforms produced by the translator circuits 240,242,244, for producing three individual pulse trains $T_3$, $M_3$, $B_3$, respectively. Each one of these pulse trains $T_3$, $M_3$ and $B_3$ are representative of the digitization of the uppermost third, central third and lowermost third portions, respectively, of the reference sinusoid from the first digital-to-analog converter circuit. Similarly, the second comparator network 246 is operative for producing three individual pulse trains $T_2$, $M_2$, $B_2$ representative of the digitization of the reference sine wave signal from the second DAC; the third comparator 246 being operative for producing three individual pulse trains $T_1$, $M_1$, $B_1$ representative of the digitization of the sinusoidal output signal from the third DAC.

The first, second and third decoder networks 248 are identical, and each include three AND gates 306,308,310, and two NOR gates 312,314. The first decoder network is operative for decoding the pulse trains $T_3$, $M_3$, $B_3$, for producing the control signals $CS_3$ and $CS_4$, for operating the switches $S_3$ and $S_4$ of the phase C inverter network of FIG. 1. In FIG. 4B, the three pulse trains 210,212,214 are representative examples of the pulse trains $T_3$, $M_3$, $B_3$, respectively, that might be obtained as output signals from the first comparator network. FIG. 4C shows the decoded signals obtained from the first decoder network in decoding the pulse trains $T_3$, $M_3$, $B_3$. In the first decoder, AND gate 310 is operative for ANDing the inversion of pulse trains $T_3$, $M_3$ with the pulse train $B_3$; AND gate 308 for ANDing the pulse trains $T_3$, $M_3$, $B_3$; AND gate 306 for ANDing together the inverse of pulse train $T_3$ with the pulse trains $B_3$ and $M_3$; NOR gate 312 is operative for NORing together the output signals from AND gates 306,308; and NOR gate 314 is operative for NORing together the output signals from AND gates 308,310. Similarly, the second decoder is operative for decoding the pulse width modulated pulse trains $T_2$, $M_2$ and $B_2$, for producing the control signals $CS'_3$ and $CS'_4$ for operating the switches $S'_3$ and $S'_4$ of the phase B' inverter network of FIG. 1. The third decoder network is operative for decoding the PWM signals $T_1$, $M_1$ and $B_1$ for producing the control signals $CS''_3$ and $CS''_4$, for operating the switches $S''_3$ and $S''_4$, respectively, of the phase A' inverter circuit of FIG. 1. Accordingly, the controller circuit of FIG. 6 is operative for producing the control signals for operating the phases A', B', C' inverter circuits of FIG. 1 for producing three-phase related output voltages for driving a three-phase load such as a motor represented by the windings 172,174,176. It should be noted with reference to FIGS. 5 and 6, that the controller circuit or system for FIG. 6 is expandable for having N decoder networks 248, N comparator networks 246, N DAC networks 234, and N code converter circuits 232, for producing control signals for operating up to N inverter stages of the inverter system of FIG. 1, for producing N-phase related synthesized AC voltages. It should also be noted that the decoder networks 248 can be modified for producing different sets of control signals for operating other types of inverter circuits not shown in FIG. 1. Lastly, it should be noted that the controller configuration of FIG. 5 and circuit schematic of FIG. 6 are not limiting, in that other circuits or systems can conceivably be designed by one skilled in the art for carrying out the method of the present invention.

What is claimed is:

1. In a converter system comprising a waveform synthesizer circuit including a plurality of switching circuit means each responsive to individual control signals, for in combination operating to invert first and second DC voltages into a multitiered step-like notched output waveform substantially equivalent to a predetermined AC waveform, a method for producing said control signals comprising the steps of:

producing a reference AC waveform having a pattern corresponding to that of said predetermined AC waveform;

producing first, second and third AC sampling waveforms, each being in phase with the other, each having the same frequency, which frequency is substantially greater than that of said reference AC waveform;

concurrently comparing said first through third AC sampling waveforms with the uppermost, central, and lowermost portions, respectively, of said reference AC waveform for producing first, second, and third pulse width modulated pulse trains, respectively, the pulse widths of the pulses of each one of said pulse trains corresponding to the period of time that the amplitude of its associated sampling waveform is less positive or more negative than the amplitude of said reference waveform between two successive intercepts thereof; and decoding said first through third pulse trains for producing the control signals for operating said plurality of switching circuit means.

2. The method of claim 1, wherein the step of producing said first, second and third AC sampling waveforms, includes the steps of:

producing an individual AC sampling waveform; and level shifting said individual AC sampling waveform three times, for producing said first, second and third AC sampling waveforms each having a different range of amplitudes.

3. The method of claim 1, further including the step of selectively varying the amplitude of said reference AC waveform for providing a predetermined notching pattern for said output waveform.

4. The method of claim 1, further including the step of selectively varying the frequency of said reference AC waveform while keeping its amplitude constant, for obtaining a desired frequency with constant amplitude of said output waveform.

5. The method of claim 1, further including the step of simultaneously varying the amplitude and frequency of said reference AC waveform, for operating said plurality of switching circuit means to produce a pattern in said output waveform, providing a desired relationship of voltage amplitude and frequency.

6. The method of claim 1, wherein said first, second and third AC sampling waveforms are each triangular waveforms.

7. In a converter system comprising a plurality of N (N=some positive integer number other than zero) waveform synthesizer circuit means each responsive to individual control signals, for in combination inverting first and second DC voltages into N phase AC output voltages, the AC voltage of each phase having a multitiered step-like notched output waveform substantially equivalent in phase and waveshape to one of N predetermined AC waveforms, respectively, a method for producing said control signals, comprising the steps of:
producing N reference AC waveforms each having a waveshape corresponding to that of said N predetermined AC waveforms, respectively, whereby for N equal to 2, said AC reference waveforms are 90° out of phase with each other, for N greater than 2 successive ones of said N reference AC waveforms are 360°/N out of phase with each other;
producing first, second and third AC sampling waveforms, each being in phase with the other, each having the same frequency, which frequency is substantially greater than that of said N reference AC waveforms;
comparing said first through third AC sampling waveforms concurrently with the uppermost, central and lowermost portions, respectively, of each individual one of said N reference AC waveforms, for producing N sets of first, second and third pulse width modulated pulse trains, respectively; and
decoding said N sets of pulse trains for producing the control signals for operating said N waveform synthesizer means, respectively.

8. A DC to three-phase AC converter system comprising:
sine wave generating means for producing first, second and third reference sine waves of like frequency and amplitude, said second and third sine waves being +120° and +240° out of phase with said first sine wave, respectively, for providing three-phase relation therebetween;
triangular wave generating means for producing first, second and third triangular timing waves of like frequency substantially greater than that of said first through third reference sine waves, said first through third triangular waves having different amplitude ranges corresponding at least to the amplitude ranges of an uppermost portion of the positive half-cylce of, central portions of the positive and negative half-cycles of, and lowermost portions of the negative half-cycle of each one of said first through third sine waves, respectively;
comparator means for concurrently comparing said first, second and third triangular waves with each one of said first, second and third reference sine waves, respectively, for producing first, second and third sets of intercept signals, respectively, each set consisting of first, second and third pulse width modulated pulse trains, the pulse widths of the pulses of each one of these pulse trains corresponding to the period of time that the amplitude of its associated triangular waveform is less than the absolute amplitude of the respective one of said reference sine waves being samples;
waveform synthesizer means responsive to a plurality of control signals for inverting the combination of a positive and a negative DC voltages into three multitiered step-like notched output waveforms substantially equivalent in phase and waveshape to said first, second and third reference sine waves, respectively; and
digital logic means for converting said first, second and third sets of intercept signals into said plurality of control signals for operating said waveform synthesizer means.

9. The converter system of claim 8, wherein said sine wave generating means includes:
clock signal generating means for producing a pulse train having a desired frequency;
up/down binary counter means responsive to said pulse train for repetitively counting the pulses thereof up to a predetermined maximum number from zero, and down from this maximum number to zero, the count at any given time being provided as a binary encoded output signal;
code converting means responsive to said binary encoded output signal, for converting this signal into first, second and third sine weighted binary signals, said second and third sine weighted binary signals being 120° and 240° out of phase with said first sine weighted binary signal, respectively; and
multiplying digital-to-analog converter means, responsive to and for converting said first through third sine weighted binary signals into analog signals representing said first through third sine waves, respectively.

10. The converter system of claim 9, further including:
means for selectively producing an amplitude reference signal of predetermined amplitude;
said multiplying digital-to-analog converter means being also responsive to said amplitude reference signal, for producing said first through third sine waves each having an amplitude proportional to the amplitude of said reference signal.

11. The converter system of claim 9, wherein said clock signal generating means includes a voltage-controlled oscillator responsive to a speed input signal, for producing said pulse train having a frequency directly proportional to the amplitude of said speed input signal.

12. The converter system of claim 9, wherein said code converting means is also responsive to a forward-/reverse signal changing state from a binary "one" level to a binary "zero" level for reversing the phasing of said second and third sine waves, whereby said second and third sine waves are +240° and +120° out of phase with said first sine wave, respectively.

13. The converter system of claim 8, wherein said triangular wave generating means includes:
a voltage-controlled triangular wave oscillator responsive to the amplitude of a speed input signal, for producing a reference triangular wave signal having a frequency directly proportional to the amplitude of said speed input signal over a range between predetermined minimum and maximum frequencies; and
first through third level translating means each receptive of said reference triangular wave signal, for level shifting this signal to produce said first, second, and third triangular timing waves, respectively.

14. A converter system comprising a plurality of N (N=some positive integer number other than zero) waveform synthesizer circuit means each responsive to individual control signals, for in combination inverting DC voltages into N phase AC output voltages, the AC voltage of each phase having a multitiered step-like notched output waveform substantially equivalent in phase and waveshape to one of N predetermined reference AC waveforms, respectively, a controller for producing said control signals, comprising:

means for producing said N reference AC waveforms, whereby for N equal to 2, said AC reference waveforms are +90° out of phase with each other, for N greater than 2 successive ones of said N reference AC waveforms are +360°/N out of phase with each other;

means for producing first, second and third AC sampling waveforms, each having the same frequency which frequency is substantially greater than that of said N reference AC waveforms;

comparator means for comparing said first through third AC sampling waveforms concurrently with the uppermost, central and lowermost portions, respectively, of each individual one of said N reference AC waveforms, for producing N sets of first, second and third pulse width modulated pulse trains, respectively; and decoder means for decoding said N sets of pulse trains for producing the control signals for operating said N waveform synthesizer means, respectively.

15. The converter system of claim 14, wherein said means for producing N reference waveforms includes:

clock signal generating means for producing a pulse train having a desired frequency:

up/down binary counter means responsive to said pulse train for repetitively counting the pulses thereof up to a predetermined maximum number from zero, and down from this maximum number to zero, the count at any given time being provided as a binary encoded output signal;

code converting means responsive to said binary encoded output signal, for converting this signal into N sine weighted binary signals which are 90° out of phase with each other for N equal to 2, and 360°/N out of phase with respect to successive ones of said N sine weighted binary signals for N greater than 2; and multiplying digital-to-analog converter means, responsive to and for converting said N sine weighted binary signals into analog signals representing said N reference AC waveforms as N reference sine waves, respectively.

16. The converter system of claim 15, further including:

signal generating means for selectively producing an amplitude reference signal of predetermined amplitude;

said multiplying digital-to-analog converter means being also responsive to said amplitude reference signal, for producing said N sine waves each having an amplitude proportional to the amplitude of said reference signal.

17. The converter system of claim 15, wherein said clock signal generating means includes a voltage-controlled oscillator responsive to a speed input signal for producing said pulse train having a frequency directly proportional to the amplitude of said speed input signal.

18. The converter system of claim 15, wherein said code converting means is also responsive to a forward-/reverse signal changing state from a binary "one" level to a binary "zero" level, for reversing the phasing of said N reference sine waves, whereby for N equal 2, the reference sine wave that was leading is now lagging its associated other phase reference sine wave, and for N greater than 2 successive ones of said N reference sine waves are −360°/N out of phase with each other.

19. The converter system of claim 14, wherein said means for producing first, second and third AC sampling waveforms includes:

a voltage-controlled oscillator responsive to the amplitude of a speed input signal, for producing a primary sampling wave signal having a frequency directly proportional to the amplitude of said speed input signal over a range between predetermined minimum and maximum frequencies; and first through third level translating means each receptive of said primary sampling wave signal, for level shifting this signal to produce said first, second and third AC sampling waveforms having different amplitude ranges corresponding at least to the amplitude ranges of an uppermost portion of the positive half-cycle of, central portions of the positive and negative half-cycles of, and lowermost portions of the negative half-cycle of, each one of said N phase related reference AC waveforms, respectively.

20. The converter system of claim 19, wherein said voltage-controlled oscillator consists of a voltage-controlled triangular wave oscillator.

* * * * *